US006078426A

United States Patent [19]

Siegfried

[11] Patent Number: 6,078,426

[45] Date of Patent: Jun. 20, 2000

[54] LIGHT DIFFUSER WITH MACROSCOPIC CHAOTICALLY AND QUASICHAOTICALLY FORMED LIGHT REFLECTING AND LIGHT REFRACTING PLANES

[75] Inventor: Hans-Günther Siegfried, Lahr, Germany

[73] Assignee: Altenburger Electronics GmbH, Germany

[21] Appl. No.: 09/159,066

[22] Filed: Sep. 23, 1998

Related U.S. Application Data

[63] Continuation of application No. PCT/DE97/01199, Jun. 11, 1997.

[30] Foreign Application Priority Data

Oct. 7, 1996 [DE] Germany ........................... 196 41 304
May 30, 1997 [DE] Germany ........................... 197 22 703

[51] Int. Cl.$^{7}$ .............................. G02B 5/02; G02B 13/20

[52] U.S. Cl. .......................... 359/599; 359/591; 359/592; 359/594; 362/811

[58] Field of Search .................................... 359/592, 593, 359/594, 595, 597, 598, 599, 665; 362/807, 808, 809, 810, 811

[56] References Cited

U.S. PATENT DOCUMENTS 3,793,755 2/1974 Gersch ...................................... 40/132
3,995,151 11/1976 Nordeen et al. ...................... 240/10 A
4,345,395 8/1982 Grassi ...................................... 40/441
4,858,083 8/1989 Wakimoto .............................. 362/101
4,978,948 12/1990 Samen .................................... 340/690
5,105,343 4/1992 Wakimoto .............................. 362/101
5,880,886 3/1999 Milner .................................... 359/599

FOREIGN PATENT DOCUMENTS

WO 96/06961 3/1996 WIPO .

*Primary Examiner*—Cassandra Spyrou
*Assistant Examiner*—Leo Boutsikaris
*Attorney, Agent, or Firm*—Fay, Sharpe, Fagan, Minnich & McKee, LLP

[57] ABSTRACT

A light diffuser includes a light scattering element particularly useful for ornamental and decorative purposes. The light scattering element has macroscopic chaotically or quasi-chaotically formed refracting planes and/or reflection planes. The light scattering element further includes a casing filled with a liquid medium. The light scattering element further includes a flexible material with macroscopic chaotically or quasi-chaotically formed exterior surfaces. The light diffuser includes viscous prisms that cause diffractions and refractions with light, interferences such as superposition of light waves, highly varied polarizations, dispersions and beam concentrations.

18 Claims, 4 Drawing Sheets

LIGHT DIFFUSER WITH MACROSCOPIC CHAOTICALLY AND QUASICHAOTICALLY FORMED LIGHT REFLECTING AND LIGHT REFRACTING PLANES

This application is a continuation of PCT/DE97/01199, Jun. 11, 1997.

BACKGROUND OF THE INVENTION

The subject invention is directed toward the art of light diffusers and, more particularly, to light diffusers used in decorative lighting applications including refractive and reflective planes which are chaotically and/or quasi-chaotically formed so that the diffuser is irregularly shaped in such a way that no regularity is recognizable with the naked eye.

The invention is especially useful in decorative and ornamental lighting and will be described with particular reference thereto; however, the invention is capable of broader application and could be used in many other environments such as, for example, in light-reactive processes for example in the photodecomposition of acids or in other chemical processes.

Light diffusers and light scattering elements having a diverse range of shapes and surface treatments are well known in the art. It is often desirable with respect to decorative lighting to create reflective or refractive effects or combinations of reflective and refractive effects having interesting light patterns either contained within the light diffuser apparatus themselves or directed at reflective surfaces such as, for example, on interior walls or ceilings of rooms or the like. Traditional diffusers and light scattering elements typically include reflectors for generating the interesting light patterns. They further typically include light conductors or solid bodies for producing the desired reflection and/or refractive effects.

For the most part, prior light diffusers were formed having solid bodies consisting mostly of glass, ceramics, plastic materials, or surface treated materials having regular geometric shapes or, alternatively, having microscopic irregular structures such as, for example, regularly repeating prism shapes. In order to achieve the desirable reflecting effects, the solid bodies of the prior light scattering elements were either formed entirely of an appropriate reflecting material or, alternatively, were coated with a suitable reflecting material of the type capable of producing the desired results. Light diffusers of this type have been expensive and heavy.

Attempts have been made to create interesting light effects by using roughened surfaces or through the use of rigid casings filled with ground glass. In order to create the interesting refractive effects, the solid light diffuser bodies must of course be formed of a transparent material. With this type of known light diffuser or light scattering element, however, the goal of achieving or creating highly interesting light effects is not attainable or falls short of the anticipated desired results.

There is a need, therefore, for a light diffuser or scattering element that is particularly well suited for decorative lighting applications and which can be used in a simple fashion to obtain highly interesting light effects.

SUMMARY OF THE INVENTION

In accordance with the subject invention, a light diffuser is provided including a light scattering element for obtaining highly interesting decorative lighting effects. The light diffuser generally comprises a light scattering element including at least a one of a plurality of macroscopic chaotically formed light reflecting planes and a plurality of macroscopic quasi-chaotically formed light reflecting planes.

Preferably, the light scattering element includes a transparent casing member and a transparent liquid medium disposed in the casing member. The casing member is shaped to form at least one of the plurality of macroscopic chaotically formed light reflecting planes and a plurality of macroscopic quasi-chaotically formed light reflecting planes. The transparent liquid medium at least partially fills the casing member.

In accordance with a further aspect of the invention, the desired interesting light effects are produced by providing macroscopic chaotic or quasi-chaotic refraction and/or reflection planes.

In connection with describing the invention herein, the term "macroscopic" is used within the scope of this application to emphasize that the structures have a certain size that is large enough to be recognized by the naked eye, as opposed to microscopic structure such as, for example, surface roughness or extremely small irregular bodies such as ground glass. The expressions "chaotic" and "quasi-chaotic" are used herein to describe a seemingly irregular structure to the naked eye that may or may not have certain irregularity (chaotic) or repeating patterns (quasi-chaotic) which however, although possibly regular or repeating (quasi-chaotic) is not recognizable through the naked eye of an observer. Chaotic and quasi-chaotic structures are at least irregular in such a way that no regularity is recognizable with the naked eye.

In accordance with an aspect of a preferred embodiment of the invention, the light scattering element includes a transparent liquid medium filled casing. The casing is macroscopic chaotically shaped and/or quasi-chaotically shaped. Alternatively, the casing can assume a corresponding irregular outer surface. The preferred light scattering elements are producible relatively inexpensively, preferably by molding, particularly when their dimensions are relatively large.

In accordance with another aspect of the invention, the casing is flexible, offering the advantage of combining a first casing with several additional flexible casings that can, for example, then be placed in a larger rigid casing for more easy interlocking and better adaptability to randomly shaped interior large rigid casing shapes.

As a direct result of the preferred embodiments of the invention, more compact structures are produced which create more interesting light effects. In accordance with the invention, it is also possible to deform the flexible light scattering elements during irradiation or illumination with light to thus create corresponding moving effects.

In accordance with another preferred embodiment of the invention, the casing includes a flexible foil that is partially filled with a liquid medium. Air within the casing is removed by suction or pressing the casing causing the casing to crumple or collapse. Thereafter, the casing is hermetically sealed. The method of withdrawing air from the casing causing it to crumple produces an irregular deformation of the casing to thereby directly produce the desired lighting effects.

In another preferred embodiment of the invention, the casing is deformed by a mechanical operation either before or after the casing is filled with the liquid medium and sealed. One preferred method of mechanically deforming the casing into its desired shape is to apply an additional heat supply while simultaneously folding, creasing, and/or crumpling the casing.

In order for the casing of the subject light diffuser to retain its desired, preferably irregular shape, the thickness of the material of the casing is selected so that the shape of the casing stays the same despite internal pressure owing to filling the casing with the transparent liquid medium. Preferably, in order to stabilize the irregular shape of the casing after it is formed, the casing is selectively coated with a transparent material such as, for example, by pouring transparent polymers over the casing so that it becomes fixed in shape. The transparent liquid medium can thereafter be poured into the casing without disturbing its irregular shape.

In accordance with a still further aspect of the invention, the casing is formed of a foil and is produced by binding together two or more preferably planar foil elements. As an example, two or more foils layered on top of each other are bonded flat at their edges leaving an initial filling hole open for introduction of the transparent viscous liquid medium therein. After the casing is filled and the opening sealed, the casing is mechanically deformed in order to obtain a preferred light diffuser element that achieves the desired refraction and/or reflective effects when exposed to irradiation or illumination.

In accordance with a still further aspect of an embodiment of the invention, the casing is formed of a foil bubble by molding flexible foil. A mold form is used into which a synthetic bubble is blown by generating a sufficiently high internal pressure. The mold form is thereby used to produce the molded part. This preferred method offers the benefit in contrast of bonding several foil elements together that the casing produced thereby has virtually no external visible seams.

Still yet alternatively, the casing can equivalently be produced from foil tubes. The tube segments are tightly sealed at both ends respectively.

In accordance with yet another embodiment of the invention, a highly deformed preferably crinkled foil is disposed within the casing member. The foil disposed within the casing is preferably transparent but can, alternatively, also include reflective material. When such embodiment is to be used to generate the interesting refracting effects in accordance with the invention, the index of refraction of the transparent foil is preferably selected to be different from the index of refraction of the liquid medium filling the casing. This is because refracting effects are only produced with the transition of light from one medium having a first index of refraction to another medium having a second index of refraction with the latter index of refraction being different from the former index of refraction. Of course, by proper selection of the indexes of refraction at the transition between the first and second mediums, it is also selectively possible and desirable for partial reflection to occur.

In accordance with still yet another embodiment of the invention, the light scattering element is formed of a solid body of one or several flexible materials having an exterior surface that is macroscopic chaotically or quasi-chaotically formed. Suitable materials for such purpose are, for example, caoutchouc-type silicones, which remain flexible at temperatures from −50 degrees C. to +200 degrees C. Such elements are simple to produce by casting or extrusion. During this procedure, the material is preferably given an intermediate shape as necessary which is then re-shaped after partial hardening. The aforementioned benefits are obtained primarily due to the flexibility of the light scattering elements.

According to another preferred embodiment of the invention, the casing member has a substantially smooth exterior surface. In this embodiment, the desired interesting refraction and/or reflection effects are obtained using elements arranged within the casing member. Preferably, the elements arranged within the casing are highly deformed, preferably crinkled foil and/or one or several light scattering elements formed in accordance with one or more of the preceding specific embodiments of the invention described above.

Further in accordance with the smooth casing member embodiment described immediately above, additional light scattering elements can be selectively arranged with highly deformed covers. These covers are then filled with a liquid medium. When a liquid medium is used in that manner, it is beneficial to fill the additional light scattering elements with liquid media having an index of refraction that is different from the index of refraction of the fluid medium surrounding the additional light scattering elements. In this manner, greater and more pronounced refraction effects are achieved than in the case where only the index of refraction of the casing material differs from that of the liquid material. The use of materials having vastly different indexes of refraction applies also with respect to the index of refraction of solid bodies. In this preferred embodiment of the invention, the outer casing preferably consists of an essentially rigid material. Thus, there is the benefit of adequate stability of the outer casing with respect to exterior mechanical influences and with respect to internal pressure of elements or liquids provided therein.

In accordance with yet a still further aspect of the invention, in order to enhance the lighting effects, additional highly deformed foils are provided at the exterior of the casing. The additional exterior foils may, in turn, selectively be transparent or at least partially reflecting.

With respect to each of the above specific preferred embodiments, additional transparent or reflecting solid bodies are selectively provided within the casing and suspended in equilibrium within the transparent viscous liquid medium.

Light scattering elements are also produced by combining together several scattering elements of the type described above in connection with the several preferred embodiments. Such combination of light scattering elements are preferably produced by gluing together or otherwise joining together the several individual light scattering elements. In this fashion, many diverse light scattering elements can be produced from one or several basic modules saving manufacturing time and cost.

The light scattering elements according to the present invention are preferably adapted to accommodate and work with both active and passive lighting. In passive lighting, the diffuser is irradiated by light from a light source located outside the light scattering element such as, for example, with a high performance light source or spotlight. In active lighting, one or more active or passive light sources are disposed within the light scattering element itself. In the case of the active light source, a low-voltage halogen lamp can be used and, in the case of a passive light source, one or more light conducting fibers are disposed with their light emitting ends located within the light scattering element. Further, other active light sources can be used such as, for example, high pressure gas discharge lamps or the like.

When the light scattering element is combined into a spatial structure formed from several individual light scattering elements, such light source then becomes adapted to be located within the spatial structure but preferably not within the liquid medium. Rather, the light source is preferably located between the outer casings of the individual light scattering elements.

When the active light source is located within the casing filled with liquid medium, the liquid is advantageously used to provide a cooling medium by means of which, specifically with respect to high performance lamps, is extremely useful to dissipate heat from the high performance lamp to bring possible heat problems under control and to enable the use of high powered lamps that, but for the cooling provided by the liquid medium, would otherwise be too hot to safely operate. Preferably, in that embodiment, the liquid medium is electrically non-conductive for reasons of safety.

As can be seen from the foregoing, a primary object of the invention is the provision of a light diffuser for use in ornamental and decorative lighting applications to produce highly desirable static or dynamic lighting effects.

A primary advantage of the invention resides in the ability to produce lightweight and generally inexpensive light diffusers that are capable of multiple applications and uses for producing desirable lighting effects.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
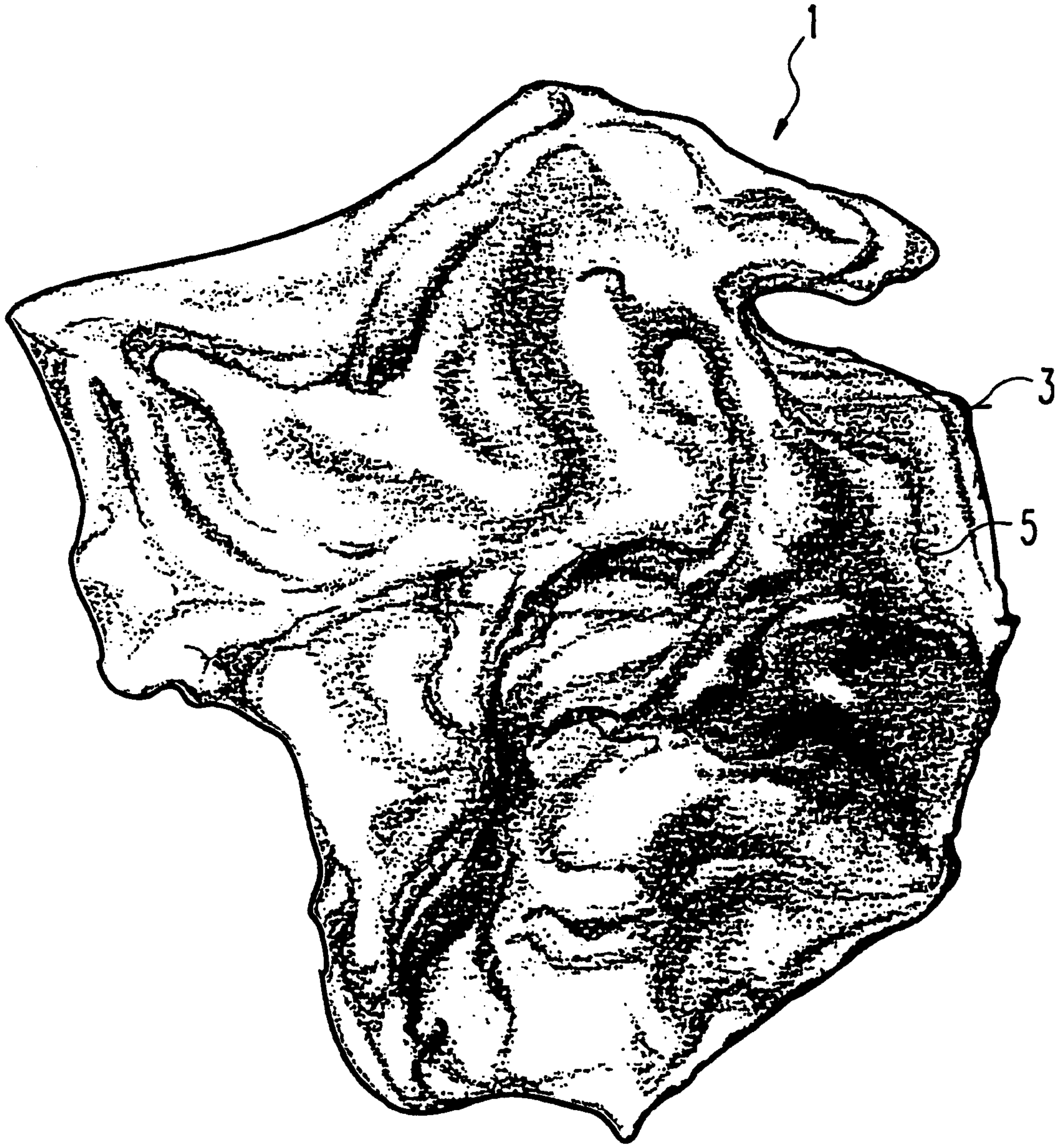
FIG. 1 is a plan view of a first preferred embodiment of a light diffuser formed in accordance with the invention having a flexible highly deformed casing.

Referring now to the drawings wherein the showings are for the purposes of illustrating the preferred embodiments of the invention only and not for purposes of limiting same, FIG. 1 shows a light scattering element 1 including a sealed flexible casing 3 which is filled with a liquid medium 5, preferably water. The sealed casing 3 has a highly irregular shape as shown. To best facilitate description of the various embodiments, all like features in the figures are denoted by the same reference numeral.

Therefor with continued reference to FIG. 1, the light scattering element 1 is preferably formed by a transparent foil bubble by blow molding, whereby a flexible transparent material, such as, for example, PVC, polyethylene, polyamide, or propylene is heated and placed in the form of a bubble into an appropriate mold. By thereafter generating an adequate internal pressure, the material is inflated to a degree until the wall of the foil material contacts the interior wall of the mold. The outer surface of the material thus takes on the interior surface profile of the mold. After the material is cooled down, the structure is taken out of the mold. Preferably, the material is flexible because of suitable material selection and, further, suitable wall thickness. More particularly, the wall is preferably thin enough and flexible enough so that the part can be removed easily from the mold. Subsequent to the part being removed from the mold, the part or casing is then totally or partially filled with a liquid medium 5 and, thereafter, the opening in the casing is hermetically sealed.

The highly irregular exterior shape of the casing 3 of the light scattering element or diffuser 1 is alternatively produced in such a manner that an initially regularly shaped casing is produced by bonding together several foil elements that are partially filled with the liquid medium. Afterwards, the remaining gas or trapped air located within the casing is at least partially suctioned out. As a result of a partial vacuum formed within the casing, the casing walls are folded or compressed irregularly into a crumpled shape such as shown in FIG. 1. After at least partially suctioning off the remaining gas, the filling opening is in turn tightly sealed. Other methods of removing the gas to cause the casing to crumple into the desired shape of course can be used such as, for example, by mechanically pressing against the partially filled casing or squeezing or the like.

The material forming the flexible casing is carefully selected. Also, the liquid filler medium is also carefully selected. Attention must be paid to the requirement for fluid tightness. For example, commercial foils made of PVC, polyethylene, propylene, or polyamide are not usually suitable for filling with water since adequate water tightness and vapor tightness is not attainable. Adequate tightness is achieved in the casing of the present invention by providing barriers on the foil surface such as, for example, by the application of alkyl-chlorosilane mixture.

Higher molecular substances are also suitable for use as the liquid filling medium such as, for example, oils of all types having a molecular size greater than the pore size of the foils. A barrier coating is not needed when oils of the above type are used as the liquid filler medium.

The light diffuser of the present invention can, in addition, be surrounded for protection against mechanical damage by providing a suitably stable protective coating (not shown) onto the casing member. A preferred method for producing such a protected casing member is by pouring a transparent polymer over the casing. Preferably, materials that will retain sufficient flexibility after hardening are employed.

The flexible diffuser shown in FIG. 1 alternatively, in accordance with the present invention, is formed in the same shape as illustrated, but as a solid body, preferably formed of a somewhat resilient material. For that purpose, caoutchouc-type silicones are suitable. Such silicones remain elastic in temperatures between −50 degrees C. to +200 degrees C. Because of their excellent chemical stability, they enable the light diffuser of the subject invention to be employed in a wide range of applications including light-reactive processes for which glass is not suitable such as, for example, in photodecomposition of acids which otherwise attack glass.

Further in accordance with the present invention, the subject light diffusers are producible by using suitably shaped molds whereby, after casting or extrusion, suitable shaping is thereafter performed.

Figure 2:
FIG. 2 is a plan view of a second preferred embodiment of a light diffuser including highly deformed foil disposed within the diffuser casing.

Turning now to FIG. 2, another embodiment of the subject light diffuser 10 is illustrated having a highly irregular shaped outer casing form 3 which is preferably produced in the same manner as previously described in connection with the light diffuser 1 shown in FIG. 2.

In FIG. 2, the light scattering element or diffuser 10 is filled with a transparent liquid medium 5. In addition, a plurality of highly irregularly shaped members 7 are provided within the casing 3. Preferably, the highly irregularly shaped members 7 are formed of crinkled transparent foil. The transparent foil generates additional fractioning or reflection effects during irradiation of the light diffuser 10 with light.

Figure 3:
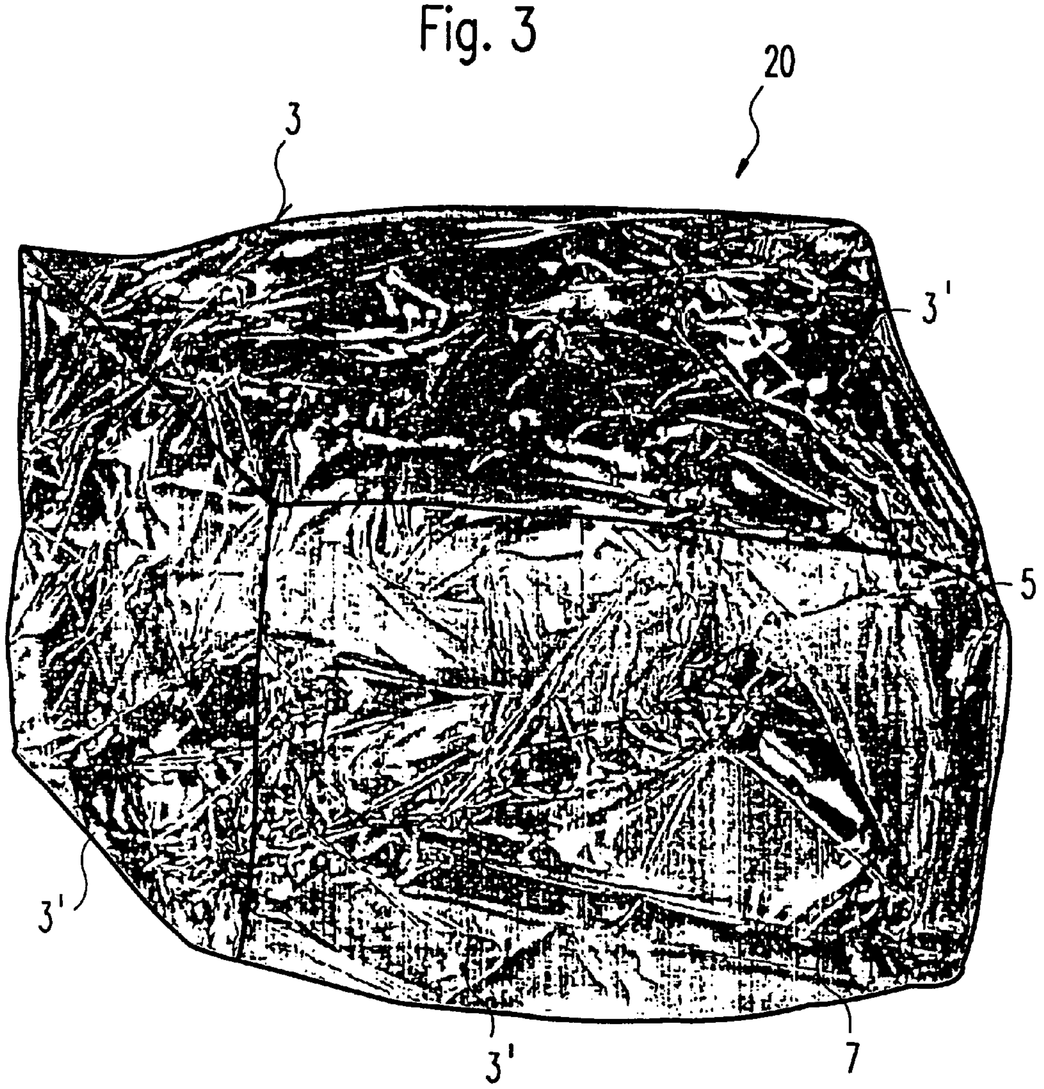
FIG. 3 is a plan view of a third preferred embodiment of a light diffuser having a geometrically formed outer casing and including highly deformed foil disposed within the casing; and, FIG. 4 shows a fourth preferred embodiment of a light diffuser formed in accordance with the invention having a rigid geometrically formed casing and including a set of light scattering elements disposed within the casing.

Turning next to FIG. 3, yet another preferred embodiment of the subject light diffuser 20 is shown including a sealed casing 3' having an essentially smooth outer surface. As shown, the smooth outer surface of the casing is not creased or crinkled in the manner as the casing illustrated in the embodiments shown in FIGS. 1 and 2. The casing 3' of the embodiment shown in FIG. 3 is preferably produced as a transparent foil bubble by molding to generate a molded part whereby a correspondingly designed mold is employed. It is, however, also possible to produce the casing by bonding together several individual foil elements 3' into a larger diffuser. Alternatively, a plurality of appropriately shaped plates or blown or otherwise shaped material such as, for example, plastic material or glass are glued together individually to produce a mechanically stable and substantially rigid casing.

A plurality of highly deformed foil elements 7 are provided within the casing 3' of the subject light scattering element 20 as shown. The highly deformed foil members 7 result in the desired lighting effects during irradiation of the diffuser 20 with light.

Figure 4:
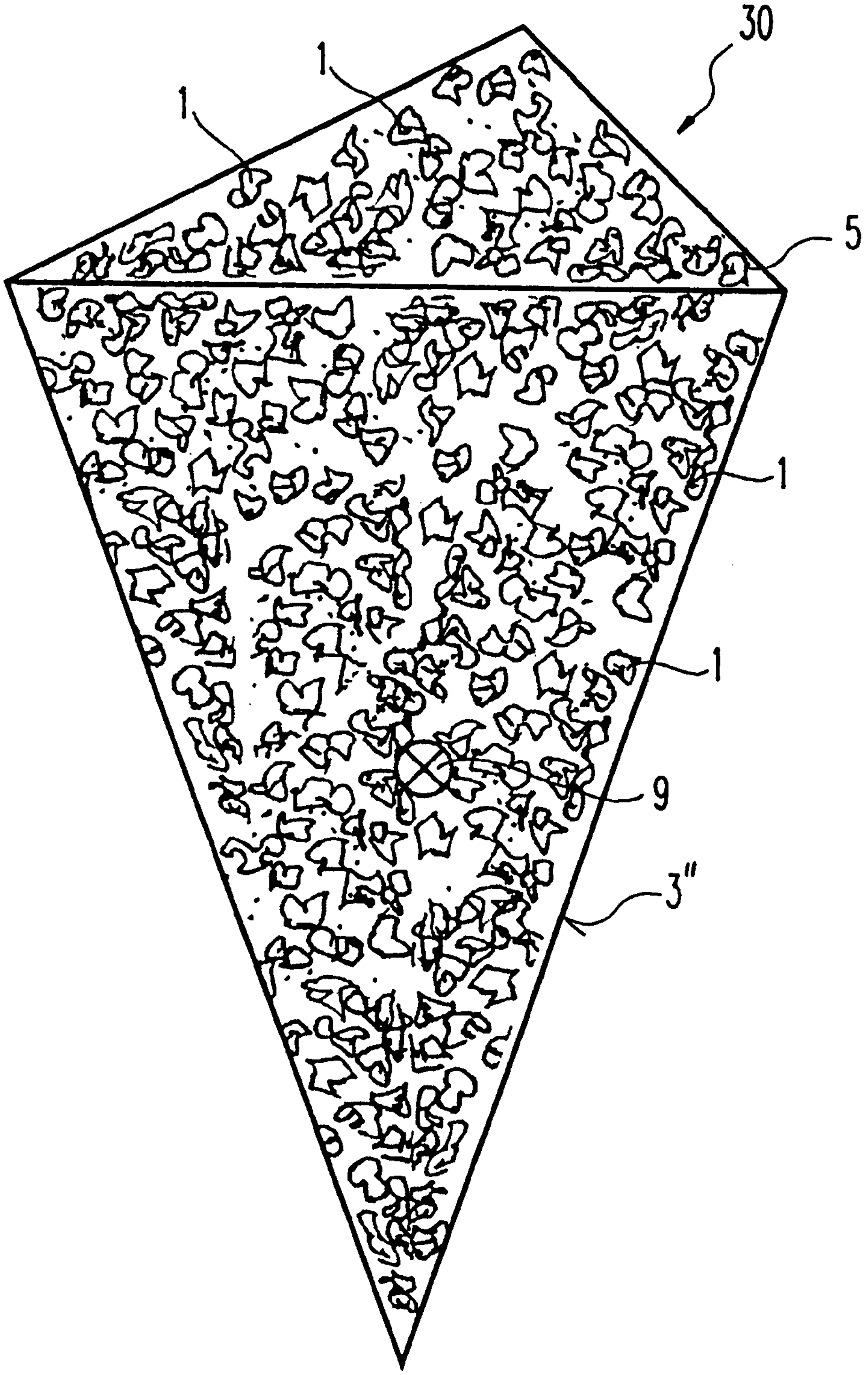

Turning lastly to FIG. 4, another preferred embodiment of the subject light diffuser 30 is shown having formed a rigid outer casing 3" which is preferably shaped into a geometric form. As shown in FIG. 4, the rigid outer casing 3" of the light diffuser 30 is shaped into the form of a pyramid although other geometric and non-geometric shapes are possible. The rigid casing 3" has sufficient stability against exterior mechanical influence so as to not deflect or otherwise deviate from the pyramid form as shown. Preferably, the rigid casing is made of acrylic, glass or any other transparent hardened material and may, of course, have any random shape. The pyramid shape is but one preferred shape.

A multiplicity of individual light scattering elements or diffusers are arranged within the rigid casing 3" as shown. The individual light scattering elements or diffusers are preferably selected from among the preferred embodiments of the light diffusers 1, 10, or 20 shown and described in connection with FIGS. 1, 2, and 3, respectively. In this manner, several or a multiplicity of such light scattering elements are combined into a larger light diffuser within a given spatial structure.

Based on the flexibility of each individual light diffuser or light scattering element 1, 10, or 20 disposed within the rigid casing 3", the light scattering elements are selectively densely packed within the casing. A result of the ability to randomly pack the individual light scattering elements into the rigid geometrically shaped casing results in interesting light effects. The individual light scattering elements may alternatively also be placed inside the rigid casing by means of mechanical pressure and for improvement flexibility at a higher temperature in order to enable a multitude of shapes of the rigid casing and to more densely arrange the packing of the light scattering elements within the casing.

The combination of the individual light scattering elements or diffusers 1, 10, and 20 may further be performed in such a manner that they are united into the desired integrated structures such as, for example, by gluing or bonding directly together so as to dispense with the need for the outer exterior rigid casing 3.

The exterior rigid casing 3" of the light diffuser 30 shown in FIG. 4 is alternatively filled with a liquid medium. As is schematically depicted in FIG. 4, the light diffuser 30 includes an active or passive light source 9 disposed within the sealed casing 3". One preferred example of an active light source is a low-voltage halogen lamp. An example of a preferred passive light source includes a light conducting fiber having a distal end adapted to emit light.

It is to be appreciated that an active or passive light source can be combined with any of the preferred embodiments described above in connection with FIGS. 1–3 as well. When an active light source is used it is to be appreciated that the active light source is liquid tight. Thus, traditional illumination bodies used for underwater lighting are preferred. The liquid medium surrounding the active light source is preferably electrically non-conductive in order to avoid, in case of a defect, all danger to persons handling the subject light diffusers of the invention.

The use of a liquid medium 5 together with active light sources within the casing 3" results in a benefit of an extremely space-efficient construction since the liquid medium is simultaneously used as a cooling medium for the dissipation of active light source energy.

In order to generate the desired lighting effects, the transparent liquid medium 5 is alternatively colored. In such instance, the index of refraction of the liquid medium 5 and the indexes of refraction of the crumpled foils 7 are preferably significantly different from each other. Otherwise, as a result of full immersion of the crumpled foils, their refractive or reflective effects would be suppressed. Widely different indexes of refraction indices would not be needed, however, if the color of the liquid medium or of the exterior casing of the diffuser is different from the color of the crumpled foil. In that instance, a highly desired lighting effect is still yet realized. The same applies to the embodiment shown in FIG. 4 where several or a multiplicity of diffuser elements 1, 10, and 20 are combined into a larger spatial structure. When such larger spatial structure is additionally surrounded by a transparent liquid medium 5, then the desired refraction and/or reflection effects are also produced in that the liquid medium within the individual light scattering elements 1, 10, and 20 has an index of refraction different from the liquid medium surrounding the individual light scattering elements.

Other interesting lighting effects also result on another alternative preferred embodiment of the invention when the light scattering element is not filled with a homogeneous liquid medium but, rather, is filled with different media that are not mixable or combinable with each other. This leads to a pronounced phase limitation whereby the different refractive indices of the fluid media produce, in turn, corresponding refractive or reflective effects.

Reflection effects are desired mostly with large illumination surfaces at the casing of individual diffusers 1, 10, and 20 or at the outer casing 3 of the spatial arrangement of individual diffusers 1, 10, and 20. This is true for light originating from an external light source for irradiation of the light diffuser as well as for incoming daylight or other outside light. To that end, all casings or individual casing preferably include complete or partial reflective coatings. This is accomplished, for example, by sputter-spraying or vapor-spraying the exterior surfaces or the interior surfaces of the casings. The casings can also be selectively coated on one side with a reflective coating so that incident light from the outside falling onto the light diffuser is reflected from the casing while light generated from within the interior side of the casing is transmitted through the casing toward the outside thereof.

The invention has been described with reference to the preferred embodiments. Obviously, modifications and alterations will occur to others upon a reading and understanding of this specification. It is intended to include all such modifications and alterations insofar as they come within the scope of the appended claims and any equivalents thereof.

Having thus described the invention, it is claimed:

1. A light diffuser comprising a light scattering element including at least one of i) a plurality of macroscopic chaotically formed light reflecting planes and ii) a plurality of macroscopic quasi-chaotically formed light reflecting planes, the light scattering element including:

a transparent casing member including flexible foil and being shaped to form said at least one of said plurality of macroscopic chaotically formed light reflecting planes and said plurality of macroscopic quasi-chaotically formed light reflecting planes; and, a transparent liquid medium disposed in said casing member, the liquid medium at least partially filling the casing member.

2. The light diffuser according to claim 1 wherein said flexible foil is deformed flexible foil forming said casing member, the deformed flexible foil being shaped by removing gas from a region of the casing member not containing said transparent liquid medium and then sealing the casing member.

3. The light diffuser according to claim 1 wherein said flexible foil is deformed flexible foil forming said casing member, the deformed flexible foil being shaped by at least a one of i) mechanically creasing and ii) mechanically crumpling the flexible foil.

4. The light diffuser according to claim 1 wherein said transparent casing member includes a plurality of substantially planar flexible foil members joined together.

5. The light diffuser according to claim 1 wherein said transparent casing member includes a plurality of substantially planar deformed flexible foil members joined together, the plurality of substantially planar deformed flexible foil members being shaped by removing gas from a region of the casing member not containing said transparent liquid medium and then sealing the casing member.

6. The light diffuser according to claim 1 wherein said transparent casing member includes a plurality of substantially planar deformed flexible foil members joined together, the plurality of substantially planar deformed flexible foil members being shaped by at least a one of mechanically creasing and mechanically crumpling the flexible foil.

7. The light diffuser according to claim 1 wherein said transparent casing member includes a transparent molded casing member formed of at least a one of polyvinyl chloride, polyethylene, polyamide, and propylene.

8. The light diffuser according to claim 7 wherein said transparent molded casing member includes deformed flexible foil members shaped by removing gas from a region of the molded casing member not containing said transparent liquid medium and then sealing the casing member.

9. The light diffuser according to claim 7 wherein said transparent molded casing member includes deformed flexible foil members shaped by at least a one of mechanically creasing and mechanically crumpling the flexible foil.

10. The light diffuser according to claim 1 further including at least one highly deformed crumpled foil member disposed in said transparent casing member.

11. The light diffuser according to claim 1 further including at least one solid body member disposed in suspended equilibrium in said liquid medium, the at least one solid body member having at least one of a transparent and a reflective property.

12. The light diffuser according to claim 1 wherein:

said light scattering element is formed of at least one transparent highly viscous flexible material; and, an outer surface of said light scattering element defines a one of a macroscopic chaotic pattern and a macroscopic quasi-chaotic pattern.

13. The light diffuser according to claim 1 wherein:

said light scattering element has a smooth outer surface; and, the diffuser includes a plurality of highly deformed crumpled foil members disposed in said casing member.

14. A light diffuser comprising:

a transparent outer casing member having a substantially smooth outer surface; and, a plurality of light scattering elements disposed in said outer casing member, wherein at least one of said light scattering elements includes:

a transparent first casing member shaped to form at least one of i) a plurality of macroscopic chaotically formed light reflecting planes and ii) a plurality of macroscopic quasi-chaotically formed light reflecting planes; and, a transparent liquid medium disposed in said first casing member, the liquid medium at least partially filling the casing member.

15. A light diffuser comprising:

a transparent outer casing member having a substantially smooth outer surface; and, a plurality of light scattering elements disposed in said outer casing member, wherein at least one of said light scattering elements includes:

a transparent first casing member shaped to form at least one of i) a plurality of macroscopic chaotically formed light reflecting planes and ii) a plurality of macroscopic quasi-chaotically formed light reflecting planes;

a transparent liquid medium disposed in said first casing member, the liquid medium at least partially filling the casing member; and, at least one highly deformed foil member disposed in the first casing member.

16. A light diffuser comprising:

a transparent outer casing member having a substantially smooth outer surface; and, a plurality of light scattering elements disposed in said outer casing member, wherein at least one of said light scattering elements includes a transparent first casing member shaped to form at least one of i) a plurality of macroscopic chaotically formed light reflecting planes and ii) a plurality of macroscopic quasi-chaotically formed light reflecting planes, the first casing member being shaped by at least a one of i) removing gas from the first casing member and then sealing the casing member ii) mechanically creasing the casing member and iii) mechanically crumpling the casing member.

17. The light diffuser according to claim 1 wherein said light scattering element includes at least one of i) a plurality of macroscopic chaotically formed light refracting planes and ii) a plurality of macroscopic quasi-chaotically formed light refracting planes.

18. The light diffuser according to claim 14 wherein said first casing member is shaped to form at least one of i) a plurality of macroscopic chaotically formed light refracting planes and ii) a plurality of macroscopic quasi-chaotically formed light refracting planes.

* * * * *